(12) United States Patent
Funatsu (10) Patent No.: US 10,618,313 B2
(45) Date of Patent: Apr. 14, 2020

(54) CONTROL APPARATUS AND CONTROL METHOD

(71) Applicant: KYOCERA Corporation, Kyoto-shi, Kyoto (JP)

(72) Inventor: Yohei Funatsu, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/313,921

(22) PCT Filed: Jun. 15, 2017

(86) PCT No.: PCT/JP2017/022223
§ 371 (c)(1),
(2) Date: Dec. 28, 2018

(87) PCT Pub. No.: WO2018/003537
PCT Pub. Date: Jan. 4, 2018

(65) Prior Publication Data
US 2019/0217629 A1    Jul. 18, 2019

(30) Foreign Application Priority Data

Jun. 28, 2016  (JP) .................................. 2016-127900

(51) Int. Cl.
*B41J 2/36* (2006.01)
*H04N 1/409* (2006.01)
(Continued)

(52) U.S. Cl.
CPC ........... *B41J 2/362* (2013.01); *B41J 2/04508* (2013.01); *B41J 2/2139* (2013.01); *G06K 15/027* (2013.01);
(Continued)

(58) Field of Classification Search
CPC ....... B41J 2/362; B41J 2/2139; B41J 2/04508
See application file for complete search history.

(56) References Cited

U.S. PATENT DOCUMENTS 5,276,459 A    1/1994  Danzuka et al.
6,347,153 B1 *  2/2002  Triplett ............. H04N 1/40062
                                                          382/224
(Continued)

FOREIGN PATENT DOCUMENTS

JP          3040425 B2     5/2000

*Primary Examiner* — Kristal Feggins
(74) *Attorney, Agent, or Firm* — Volpe and Koenig, P.C.

(57) ABSTRACT

A control apparatus for generating a control signal for controlling a printer on the basis of an input signal includes: a quantizer configured to generate the control signal by quantizing an intermediate signal generated by multiplication, performed by a first multiplier, of the input signal by a correction gain for controlling a correction amount for a print density error, together with subtraction, performed by a first calculator, from the input signal, of an error diffusion output signal output from a diffusion matrix that determines a distribution of the print density error; a second multiplier configured to multiply the control signal by an adjustment gain determined on the basis of the correction gain; and a second calculator configured to generate an error diffusion input signal to be input to the diffusion matrix on the basis of a signal output from the second multiplier.

4 Claims, 10 Drawing Sheets (51) Int. Cl.
  *G06K 15/02* (2006.01)
  *H04N 1/405* (2006.01)
  *B41J 2/045* (2006.01)
  *B41J 2/21* (2006.01)

(52) U.S. Cl.
  CPC .......... *H04N 1/405* (2013.01); *H04N 1/4052* (2013.01); *H04N 1/4092* (2013.01)

(56) References Cited

U.S. PATENT DOCUMENTS

2013/0342587 A1* 12/2013 Nakagawa ............... G09G 3/20
  345/690
2015/0154937 A1* 6/2015 Funatsu .................. G09G 5/02
  345/593

* cited by examiner

|   |   | * | 7 | 5 |
|---|---|---|---|---|
| 3 | 4 | 7 | 5 | 3 |
| 1 | 3 | 5 | 3 | 1 |

CONTROL APPARATUS AND CONTROL METHOD

CROSS REFERENCE TO RELATED APPLICATION

This application claims priority to and the benefit of Japanese Patent Application No. 2016-127900 (filed on Jun. 28, 2016), the entire contents of which are incorporated herein by reference.

TECHNICAL FIELD

The present disclosure relates to a control apparatus and a control method.

BACKGROUND

When printing is performed using an ink jet printer, an image output as a print result may have an uneven density distribution with streaks and unevenness due to, for example, the characteristics of the nozzles for ejecting ink droplets. As such, conventional technologies which adjust ink droplet volume in order to prevent the occurrence of streaks and unevenness are known. For example, a known apparatus generates correction data on the basis of a density distribution of a print result of a test pattern and adjusts the volume of the ink droplets for image printing on the basis of the correction data.

SUMMARY

A control apparatus according to an embodiment is a control apparatus for generating a control signal for controlling a printer on the basis of an input signal. The control apparatus includes a quantizer, a second multiplier, and a second calculator. The quantizer generates the control signal by quantizing an intermediate signal generated by multiplication by a correction gain for controlling a correction amount for a print density error, together with subtraction of an error diffusion output signal output from a diffusion matrix that determines a distribution of the print density error, the multiplication and the subtraction being performed on the input signal by a first multiplier and a first calculator, respectively. The second multiplier multiplies the control signal by an adjustment gain determined on the basis of the correction gain. The second calculator generates an error diffusion input signal to be input to the diffusion matrix on the basis of a signal output from the second multiplier.

A control method according to an embodiment is a control method performed by a control apparatus for generating a control signal for controlling a printer on the basis of an input signal. The control method includes a step in which the control apparatus generates the control signal by quantizing an intermediate signal generated by multiplication by a correction gain for controlling a correction amount for a print density error, together with subtraction of an error diffusion output signal output from a diffusion matrix that determines a distribution of the print density error, the multiplication and the subtraction being performed on the input signal. The control method includes a step in which the control apparatus multiplies the control signal by an adjustment gain determined on the basis of the correction gain. The control method includes a step in which the control apparatus generates an error diffusion input signal to be input to the diffusion matrix on the basis of a signal obtained by multiplication by the adjustment gain.

DETAILED DESCRIPTION

The present disclosure concerns an improved control apparatus and control method for enhancing the sharpness of a printed image.

Figure 8:
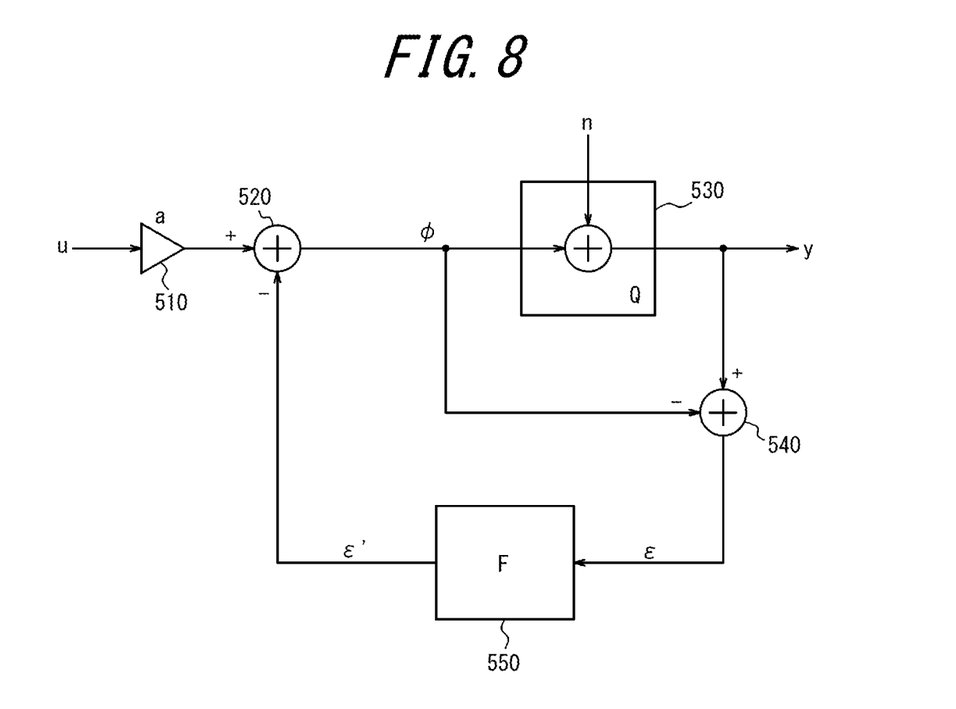
FIG. 8 is a block diagram illustrating an example of a signal processing procedure performed by a related printer.

First, an example of signal processing by a related printer will be described. FIG. 8 is a block diagram illustrating an example of a signal processing procedure performed by a related printer. This printer functions as a control apparatus for performing the processing illustrated in the block diagram of FIG. 8. The printer includes a controller configured to control and manage the printer in its entirety. The controller is constituted by a processor such as a central processing unit (CPU) for executing a program that defines a control procedure.

The controller of the printer generates an image data signal y (an output signal) to be output by performing a predetermined calculation on an image data signal u (an input signal) that has been input. The controller causes nozzles of the printer to eject ink on the basis of the output signal y. Thus, the printer performs printing. Here, an example in which the controller generates the output signal y by using a conventional so-called error diffusion method will be described.

Here, the printer is described as employing a single pass method. According to printers that employ the single path method, a head carriage provided with nozzles is fixed in the printer and printing is performed by ejecting ink from the nozzles to printing paper being conveyed. The head carriage of the printer includes a plurality of nozzles arranged in a direction orthogonal to the direction (a conveyance direction) in which the printing paper is conveyed during printing.

The controller generates the output signal y with respect to each of the plurality of nozzles of the printer. Here, a generation process for the output signals y performed by the controller will be described. Here, a generation process for the output signal $y_i$ for controlling the ink ejection from the i-th nozzle located i-th from the right in the conveyance direction will be described. Hereinafter, each signal related to the control of the i-th nozzle will be denoted by a reference numeral with i in subscript.

A block diagram of FIG. 8 includes a multiplier 510, a first calculator 520, a quantizer 530, a second calculator 540, and a diffusion matrix 550. Each of the first calculator 520 and the second calculator 540 is constituted by, for example, an adder.

The input signal $u_i$ is input to the multiplier 510. The multiplier 510 multiplies the input signal $u_i$ by a correction gain $a_i$. The correction gain $a_i$ is used for controlling a correction amount for an error in printing density caused by, for example, an error in an injection amount or injection position of a nozzle. The correction gain $a_i$ is defined as an inverse of, for example, a device characteristic $d_i$ of the i-th nozzle. That is, the following equation (1) is satisfied.

$$a_i = 1/d_i \tag{1}$$

Here, the device characteristic $d_i$ represents a characteristic of the printing density of an i-th pixel actually printed by the i-th nozzle for a signal input to the i-th nozzle. For example, when the device characteristic $d_i=0.5$, the printing density of the i-th pixel printed by the i-th nozzle is half the printing density of a pixel with the device characteristic $d_i=1.0$. When the device characteristic $d_i$ of the i-th nozzle is $d_i=0.5$ and the device characteristics of the other nozzles are 1.0, printing on the basis of the same input signal without considering the device characteristics causes the printing density of the i-th pixel to be lighter than that of the other pixels, generating streaks in a printed image.

Figure 9:
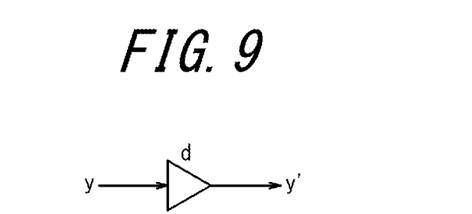
FIG. 9 is a diagram schematically illustrating a variation of printing density caused by a device characteristic.

FIG. 9 is a diagram schematically illustrating a variation of the printing density due to the device characteristic $d_i$. In response to a control signal $y_i$ for the i-th nozzle, a variation is caused by the device characteristic $d_i$, resulting in actual printing density of $y'_i$. A relationship between the printing density $y'_i$ and the control signal $y_i$ is expressed by the following equation (2).

$$y'_i = y_i * d_i \tag{2}$$

The first calculator 520 generates an intermediate signal $\varphi_i$ by subtracting, from a signal output by the multiplier 510, an error diffusion output signal $\varepsilon'_i$ from the diffusion matrix 550. The diffusion matrix 550 is an error distribution table used in the error diffusion method, and will be described in detail later. The intermediate signal $\varphi_i$ is expressed by the following equation (3).

$$\varphi_i = a_i * u_i - \varepsilon'_i \tag{3}$$

As described above, the related printer multiplies the correction gain before subtracting the error diffusion output signal $\varepsilon'_i$.

The quantizer 530 generates a control signal $y_i$ by quantizing the intermediate signal $\varphi_i$. A quantization error n is input to the quantizer 530. In the present example, the quantization error n is equal to the error diffusion input signal $\varepsilon'_i$. The control signal $y_i$ is expressed by the following equation (4) by using a function Q representing the quantization processing.

$$y_i = Q(\varphi_i) \tag{4}$$

The printer prints on the basis of the control signal $y_i$ calculated from the equation (4).

Figure 10:
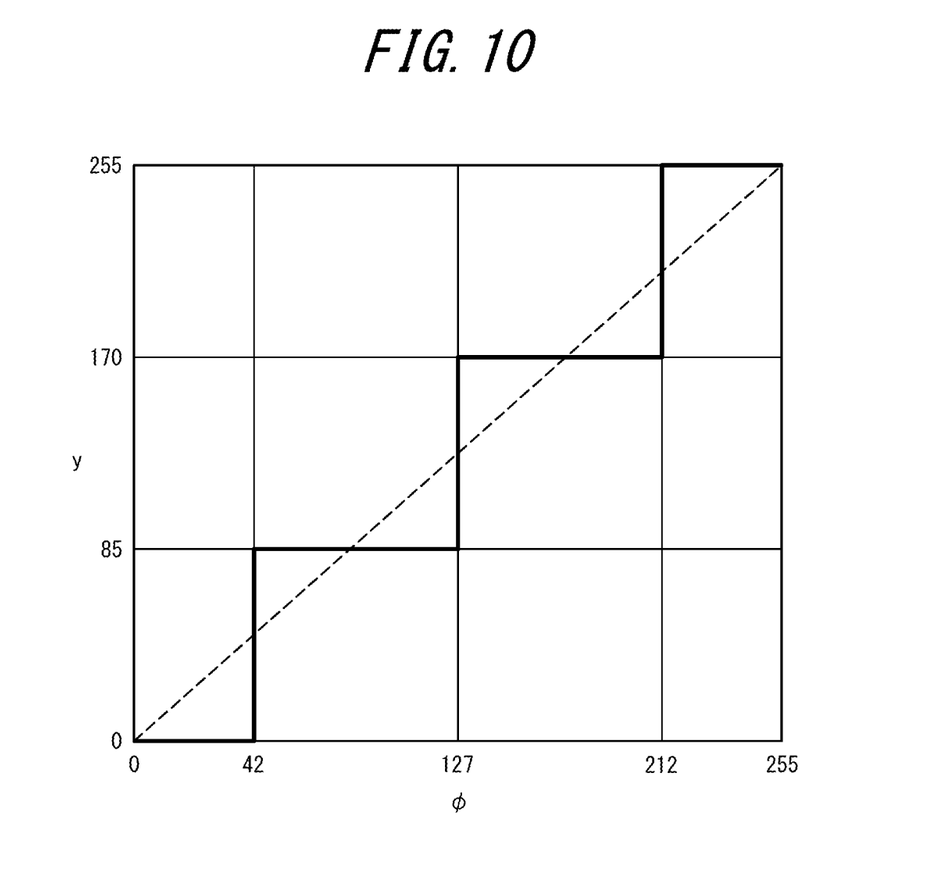
FIG. 10 is a graph illustrating an example of an input-output relationship of a signal in a quantizer.

FIG. 10 is a diagram illustrating an example of a signal input-output relationship in the quantizer 530. FIG. 10 illustrates an example in which the signal processed by the controller is 8 bits. In this example, as illustrated in FIG. 10, the quantizer 530 generates the control signal $y_i$ in a stepped form in response to the intermediate signal $\varphi_i$.

The second calculator 540 generates the error diffusion input signal $\varepsilon_i$ by subtracting the intermediate signal $\varphi_i$ from the control signal $y_i$. The error diffusion input signal $\varepsilon_i$ is expressed by the following equation (5).

$$\varepsilon_i = Q(\varphi_i) - \varphi_i \tag{5}$$

Figure 11:
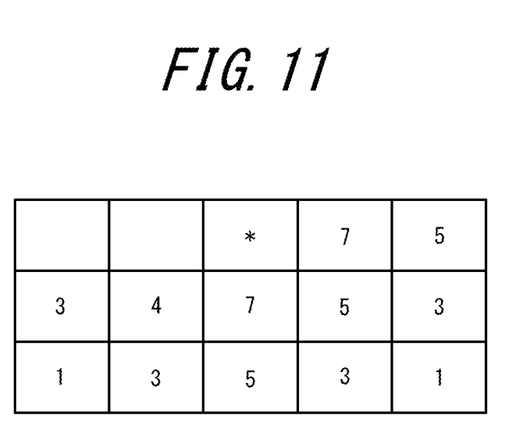
FIG. 11 is a diagram illustrating an example of a diffusion matrix.

The error diffusion input signal $\varepsilon_i$ is input to the diffusion matrix 550. The diffusion matrix 550 generates an error diffusion output signal $\varepsilon'_{i+1}$ by performing a predetermined processing on the basis of the error diffusion input signal $\varepsilon_i$. The diffusion matrix 550 is, for example, the error distribution table experimentally set on the basis of a relative distance to a target pixel (the pixel printed by the i-th nozzle). FIG. 11 is a diagram illustrating an example of a diffusion matrix. In FIG. 11, * represents a pixel printed by the i-th nozzle, i.e., a target pixel. The controller generates the error diffusion output signal $\varepsilon'_{i+1}$ for diffusing the error to the (i+1)th pixel by using the diffusion matrix 550. The error diffusion output signal $\varepsilon'_{i+1}$ is used, as error feedback of error diffusion, for the generation of the control signal $y_{i+1}$ for the (i+1)th nozzle. When the diffusion matrix 550 has the characteristic whereby all errors in the printing density are diffused to the next pixel, the error diffusion output signal $\varepsilon'_{i+1}$ output from the diffusion matrix 550 is expressed by the following equation (6) by using a function F indicating processing by the diffusion matrix 550.

$$\varepsilon'_{i+1} = F(\varepsilon_i) \tag{6}$$

In this way, the controller generates the control signal $y_i$ on the basis of the input signal $u_i$.

In the processing described above by the related printer, it is necessary to adjust the diffusion matrix of the error diffusion in order to enhance the sharpness of the printed image by error diffusion. For example, the sharpness can be increased by narrowing a diffusion range of the diffusion matrix. However, when the sharpness is enhanced by this method, controlling the sharpness by dividing the sharpness into a plurality of stages requires a number of diffusion matrixes corresponding to the number of stages. As a result, the memory requirements of the printer in order to store the diffusion matrix increases.

Next, a printer according to the present embodiment that is capable of controlling the sharpness in a plurality of steps with less memory usage will be described.

Figure 1:
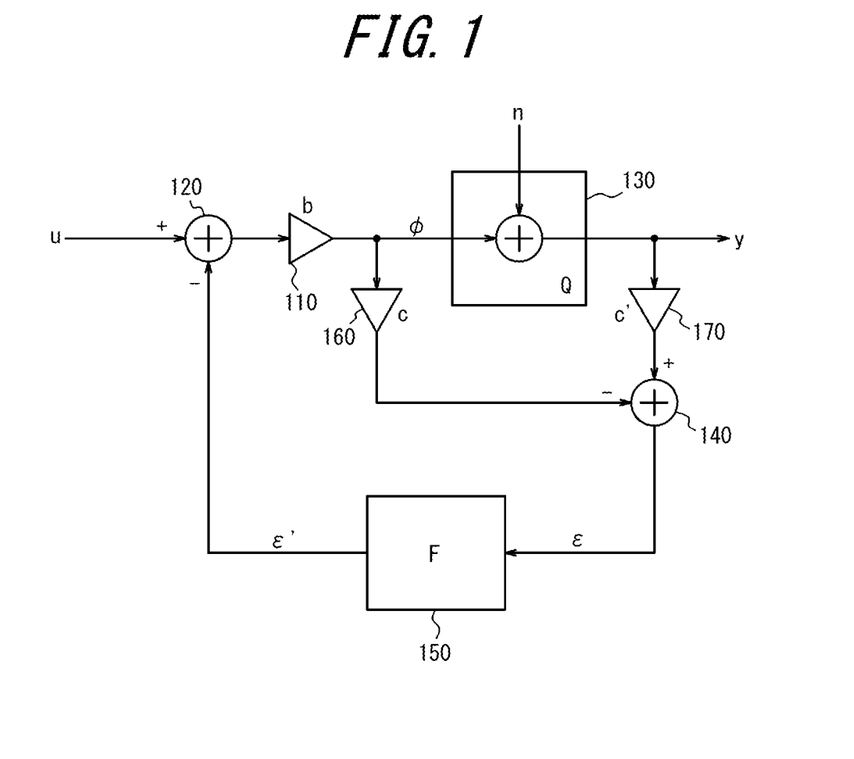
FIG. 1 is a block diagram illustrating an example of a signal processing procedure performed by a printer according to an embodiment.

FIG. 1 is a block diagram illustrating an example of the signal processing procedure performed by a printer according to an embodiment. The printer functions as a control apparatus for performing the processing illustrated in the block diagram of FIG. 1. The block diagram of FIG. 1 includes a first multiplier 110, a first calculator 120, a quantizer 130, a second calculator 140, a diffusion matrix 150, a second multiplier 170, and a third multiplier 160. Each of the first calculator 120 and the second calculator 140 is constituted by, for example, an adder.

According to the present embodiment, the first multiplier 110 is arranged between the first calculator 120 and the quantizer 130. According to the present embodiment, that is, the first multiplier 110 performs processing after the first calculator 120 has performed processing. The third multiplier 160 is arranged between the second calculator 140 and the first multiplier 110, and the second multiplier 170 is arranged between the second calculator 140 and the quantizer 130. According to the present embodiment, thus, the sharpness of the printed image resulting from the control signal subjected to the error diffusion processing may be controlled by multiplication of the signal before the quantization and the signal after the quantization by predetermined adjustment gains (a first adjustment gain and a second adjustment gain), which will be described later, performed by the second multiplier 170 and the third multiplier 160, respectively. Here, a process to generate the control signal $y_i$ by the controller according to the present embodiment will be described.

According to the present embodiment, the input signal is input to the first calculator 120. The first calculator 120 generates the error diffusion processing signal by subtracting the error diffusion output signal $\varepsilon'_i$ from the input signal $u_i$. The first multiplier 110 generates the intermediate signal $\varphi_i$ by multiplying the error diffusion processing signal by a correction gain $b_i$. As with the correction gain $a_i$, for example, the correction gain $b_i$ is defined as the inverse of the device characteristic $d_i$. The intermediate signal $\varphi_i$ is expressed by the following equation (7).

$$\varphi_i = b_i * (u_i - \varepsilon'_i) \tag{7}$$

The intermediate signal $\varphi_i$ is input to the quantizer 130 and the third multiplier 160.

The quantizer 130 generates the control signal $y_i$ by quantizing the intermediate signal $\varphi_i$. The quantizing processing by the quantizer 130 according to the present embodiment may be similar to, for example, the quantizing processing by the related quantizer 530 described with reference to FIG. 10. Thus, detailed descriptions of the quantizing processing will be omitted. The control signal $y_i$, is expressed by the following equation (8) by using the function Q representing the quantizing processing.

$$y_i = Q(\varphi_i) \tag{8}$$

The third multiplier 160 multiplies the intermediate signal $\varphi_i$ by the first adjustment gain $c_i$. The first adjustment gain $c_i$ is a gain for compensating for a deviation caused by the multiplication of the correction gain b, in the first multiplier 110. According to the present embodiment, the first adjustment gain $c_i$, is appropriately set as, for example, the inverse of the correction gain $b_i$. That is, the first adjustment gain $c_i$ is expressed by the following equation (9).

$$c_i = 1/b_i \tag{9}$$

The signal obtained by multiplication by the first adjustment gain $c_i$, in the third multiplier 160 is input to the second calculator 140.

The second multiplier 170 multiplies the control signal $y_i$, output from the quantizer 130 by a second adjustment gain $c'_i$. The second adjustment gain $c'_i$, is a gain for compensating for the deviation caused by the multiplication of the correction gain $b_i$, in the first multiplier 110 and also for adjusting the sharpness of the image. The second adjustment gain $c'_i$, is appropriately determined according to, for example, a desired sharpness. When the second adjustment gain $c'_i$, is larger than the first adjustment gain $c'_i$, (i.e., $c'_i > c_i$), the sharpness increases. When the second adjustment gain $c'_i$, is smaller than the first adjustment gain $c_i$, (i.e., of $c'_i < c_i$), the sharpness decreases. A relationship between the magnitudes of the first adjustment gain $c_i$, and the second adjustment gain $c'_i$, and the sharpness will be described in detail with reference to FIG. 5. The signal obtained by multiplication by the second adjustment gain $c'_i$ in the second multiplier 170 is input to the second calculator 140.

The second calculator 140 generates the error diffusion input signal $\varepsilon_i$ by subtracting the signal input from the third multiplier 160 from the signal input from the second multiplier 170. The error diffusion input signal $\varepsilon_i$ is expressed by the following equation (10).

$$\varepsilon_i = c'_i * Q(\varphi_i) - c_i * \varphi_i \tag{10}$$

The error diffusion input signal $\varepsilon_i$ is input to the diffusion matrix 150.

The diffusion matrix 150 generates the error diffusion output signal $\varepsilon'_{i+1}$ by performing a predetermined processing on the error diffusion input signal $\varepsilon_i$ that has been input. The error diffusion output signal $\varepsilon'_{i+1}$ output from the diffusion matrix 150 is expressed by the following equation (11), wherein the function F represents the processing by the diffusion matrix 150.

$$\varepsilon'_{i+1} = F(\varepsilon_i) \tag{11}$$

In the present example, a signal with the same value as the error diffusion input signal $\varepsilon_i$ is output as the error diffusion output signal $\varepsilon'_{i+1}$ from the diffusion matrix 150. The control signal $y_{i+1}$ for the (i+1)th nozzle is calculated by using the error diffusion output signal $\varepsilon'_{i+1}$.

Figure 2:
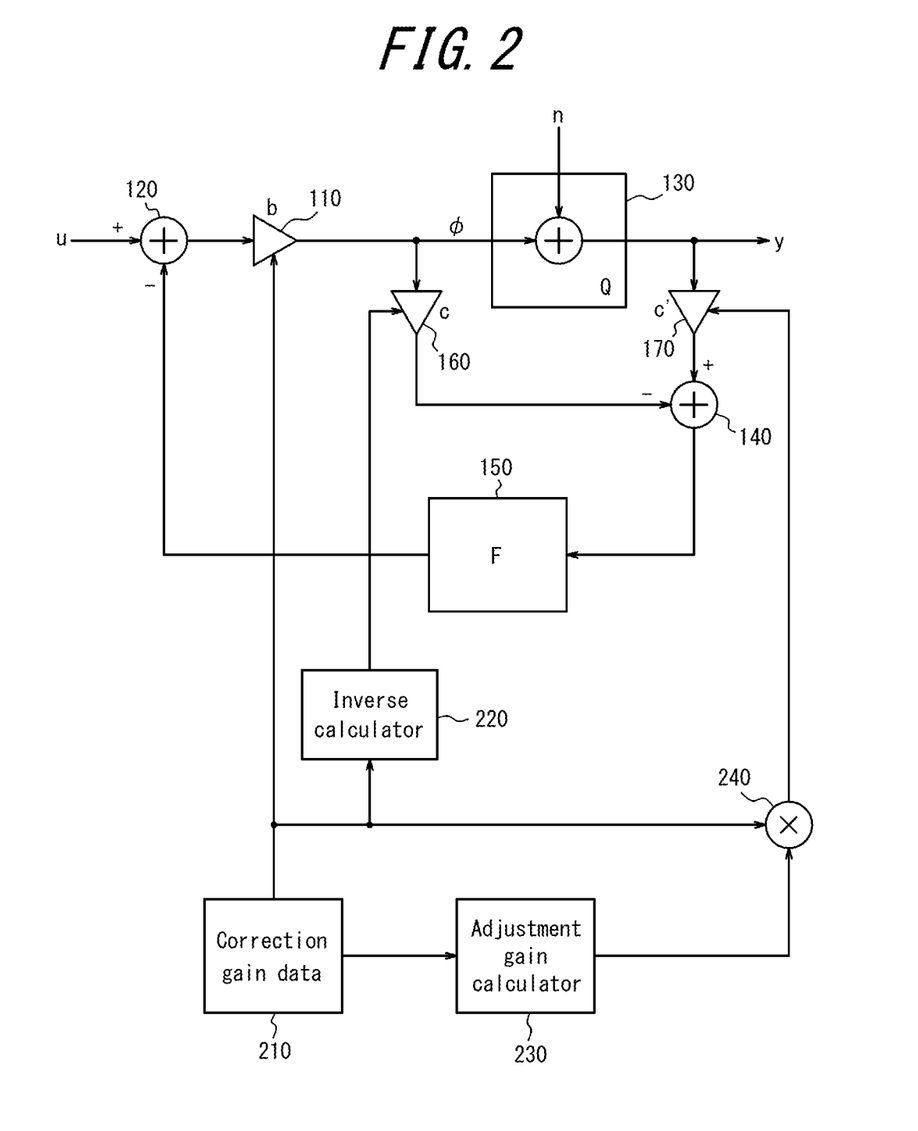
FIG. 2 is a block diagram illustrating an example of a gain input to each multiplier in the block diagram of FIG. 1.

FIG. 2 is a block diagram illustrating the gains (the correction gain $b_i$, the first adjustment gain $c_i$, and the second adjustment gain $c'_i$) input to the first multiplier 110, the third multiplier 160, and the second multiplier 170, respectively. FIG. 2 illustrates an example in which the sharpness is controlled by the correction gain $b_i$.

The correction gain data 210 is, for example, data representing the correction gain $b_i$ stored in a memory such as a semiconductor memory provided to the printer. The correction gain $b_i$ is input to the first multiplier 110 from the correction gain data 210.

The inverse calculator 220 is a calculator that calculates the inverse of the correction gain $b_i$ supplied from the correction gain data 210. The inverse calculator 220 generates the first adjustment gain $c_i$, by calculating the inverse of the correction gain $b_i$. The inverse calculator 220 may generate the first adjustment gain $c_i$, by, for example, referring to a lookup table. The first adjustment gain $c_i$ generated by the inverse calculator 220 is input to the third multiplier 160.

The adjustment gain calculator 230 is a calculator that performs a predetermined calculation on the correction gain $b_i$ supplied from the correction gain data 210. The adjustment gain calculator 230 may perform a predetermined output based on the correction gain $b_i$ that has been input, by referring to, for example, a lookup table. The signal obtained through calculation and output by the adjustment gain calculator 230 is multiplied, in the third calculator 240, by the correction gain $b_i$, supplied from the correction gain data 210 to generate the second adjustment gain $c'_i$. The second adjustment gain $c'_i$ generated by the third calculator 240 is input to the second multiplier 170.

Figure 3:
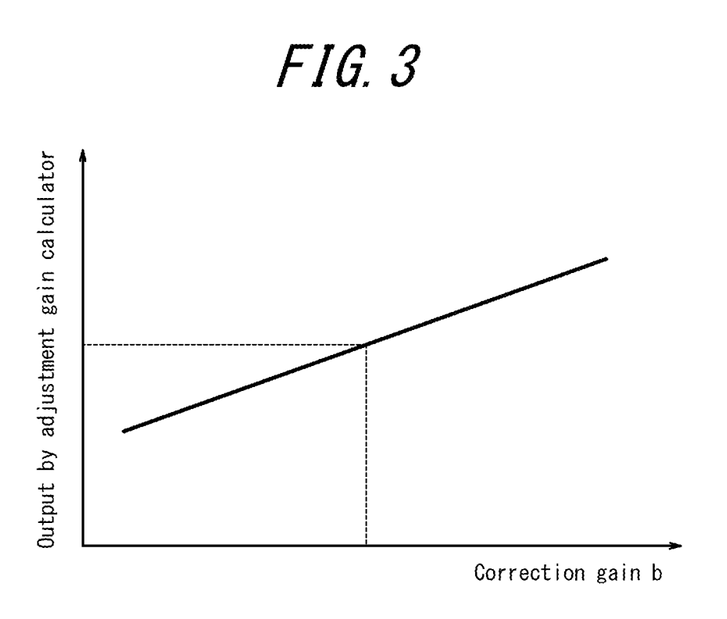
FIG. 3 is a graph illustrating an example of an input-output characteristic of an adjustment gain calculator of FIG. 2.

FIG. 3 is a diagram illustrating an example of input/output characteristic of the adjustment gain calculator 230 of FIG. 2. In the example illustrated in FIG. 3, the larger the correction gain $b_i$, the larger the output. Accordingly, as the correction gain $b_i$, increases, the second adjustment gain $c'_i$ input to the second multiplier 170 also increases, enhancing the sharpness. The input-output characteristic illustrated in FIG. 3 may be constituted by, for example, a look-up table or may be formulated as, for example, a linear function having an intercept and an inclination.

Here, the signal processing by the controller will be described by using specific values. Here, the input signals to the (i−2)th to (i+1)th nozzles are 111 by 8 bit conversion. That is, $u_{i-2}=u_{i-1}=u_i=u_{i+1}=111$ is satisfied.

The device characteristic $d_i$ of the i-th nozzle is $d_i=0.5$, and the device characteristics $d_{i-2}$, $d_{i-1}$, and $d_{i+1}$ of the (i−2)th nozzle, the (i−1)th nozzle, and the (i+1)th nozzle satisfy $d_{i-2}=d_{i-1}=d_{i+1}=1.0$. In this case, the correction gain $b_i$ of the i-th nozzle is $b_i=1/d_i=2.0$, and the correction gains $b_{i-2}$ of the (i−2)th nozzle, $b_{i-1}$ of the (i−1)th nozzle, and $b_{i+1}$ of the (i+1)th nozzle satisfy $b_{i-2}=b_{i-1}=b_{i+1}=1.0$. For the inverse c of the correction gain, $c_i=0.5$ and $c_{i-2}=c_{i-1}=c_{i+1}=1.0$ are calculated.

Further, the diffusion matrix 550 is assumed to have a characteristic whereby all the error in the printing density is diffused to the next pixels, and the error diffusion output signal $\varepsilon'_{i-3}$ used in the generation of the control signal $y_{i-2}$ related to the (i−2)th nozzle is assumed to be $\varepsilon'_{i-3}=0$.

First, an example in which the first adjustment gain c and the second adjustment gain c' are equal to each other, that is, an example in which $c'=c*1.0$ is satisfied will be described. In this case, $c'_{i-1}=c'_{i-1}=c'_{i+1}=1.0$, and $c'_i=0.5$.

Under the above conditions, the control signals for the (i−2)th to (i+1)th nozzles are calculated as follows.

$$y_{i-2}=85, y_{i-1}=170, y_i=170, y_{i+1}=85$$

Next, an example in which the second adjustment gain c' is larger than the first adjustment gain c will be described. Here, by way of example, a case in which the second adjustment gain c' is 1.2 times the first adjustment gain c, i.e., $c'=c*1.2$ will be described. In this case, $c'_{i-2}=c'_{i+1}=c'_{i+1}=1.2$, and $c'_i=0.6$.

Under the above conditions, the control signals for the (i−2)th to (i+1)th nozzles are calculated as follows.

$$y_{i-2}=85, y_{i-1}=85, y_i=255, y_{i-1}=85$$

Further, an example in which the second adjustment gain c' is smaller than the first adjustment gain c will be described. Here, by way of example, a case in which the second adjustment gain c' is 0.8 times the first adjustment gain c, i.e., a case in which $c'=c*0.8$ will be described. In this case, $c'_{i-2}=c'_{i-1}=c'_{i+1}=0.8$, and $c'_i=0.4$.

Under the above condition, the control signals for the (i−2)th to (i+1)th nozzles are calculated as follows.

$$y_{i-1}=85, y_{i-1}=170, y_i=255, y_{i+1}=170$$

Here, a relationship between the value of the second adjustment gain c' with respect to the first adjustment gain c and the control signal y will be described.

Figure 4:
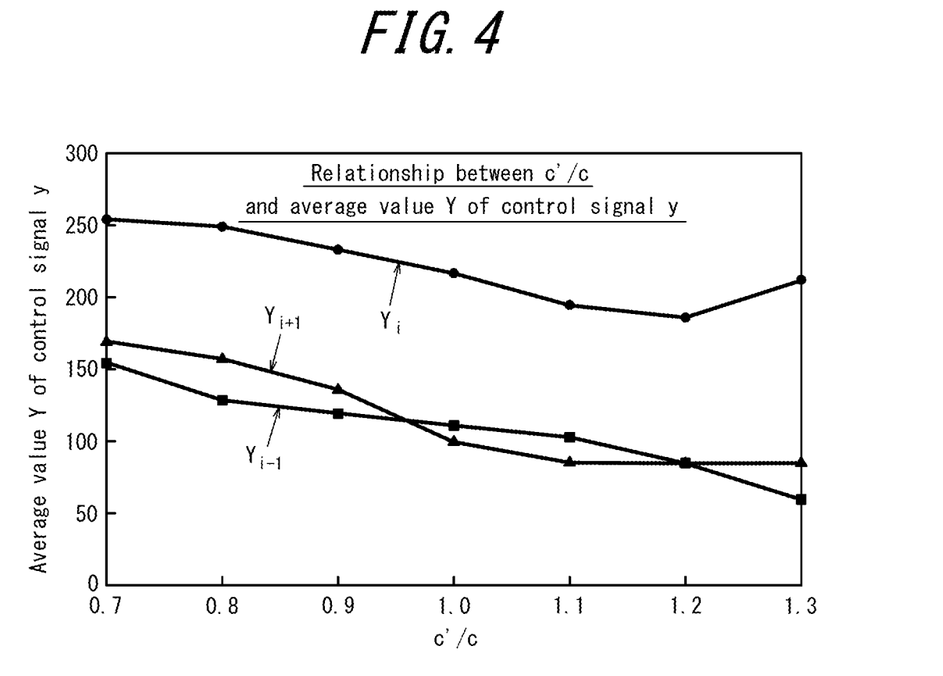
FIG. 4 is a graph illustrating a relationship between a ratio of a second adjustment gain to a first adjustment gain and an average value of a control signal.

FIG. 4 is a graph illustrating the relationship between a ratio c'/c of the second adjustment gain c' to the first adjustment gain c and the average value Y of the control signal y. In FIG. 4, the vertical axis represents the average value Y of the control signal y. The average value Y of the control signal y is an average of the output signals $y_{i-1}$, $y_i$, and $y_{i+1}$ when the error diffusion output signal $\varepsilon'_{i-3}$ used for the calculation of the input signal $y_{i-2}$ to the (i−2)th nozzle is varied. FIG. 4 illustrates the average values $Y_{i-1}$, $Y_i$, and $Y_{i+1}$ of the output signals $y_{i-1}$, $y_i$, and $y_{i+1}$, respectively, when the error diffusion output signal $\varepsilon'_{i-3}$ is varied in increments of 1 within a range of −42 to 42. In FIG. 4, the horizontal axis represents the value of c'/c. FIG. 4 illustrates the average values $Y_{i-1}$, $Y_i$, and $Y_{i+1}$ of the output signals $y_{i-1}$, $y_i$, and $y_{i+1}$, respectively, when the value of c'/c is varied in increments of 0.1 within a range of 0.7 to 1.3.

Here, $Y_{max}$ represents a maximum value of the average values $Y_{i-1}$, $Y_i$, and $Y_{i+1}$, $Y_{min}$ represents a minimum value thereof, and $Y_{ave}$ represents an average value thereof. According to the present embodiment, the sharpness is defined by the following equation (12).

$$\text{Sharpness}=(Y_{max}-Y_{min})/Y_{ave} \quad (12)$$

The larger the value of the sharpness expressed by the equation (12), the more a harmonic component of the image to which the correction gain $b_i$ is applied is emphasized. The smaller the value of the sharpness, the more the harmonic component of the image is suppressed.

Figure 5:
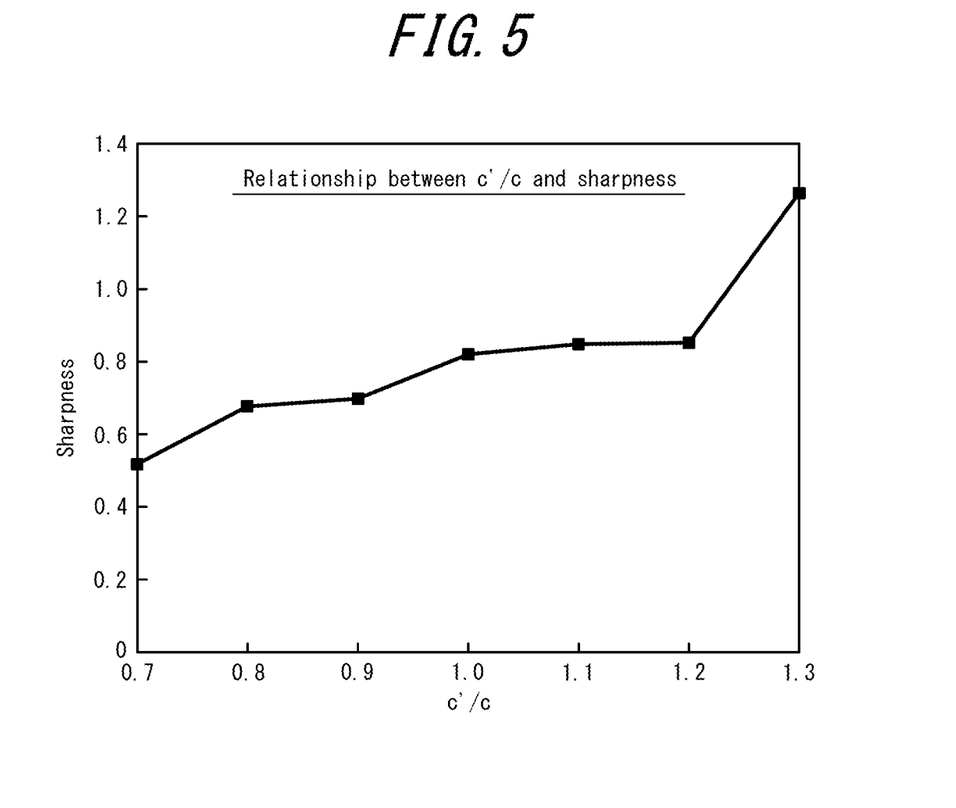
FIG. 5 is a graph illustrating a relationship between the ratio of the second adjustment gain to the first adjustment gain and sharpness.

FIG. 5 is a graph illustrating a relationship between the ratio c'/c of the second adjustment gain c' to the first adjustment gain c and the sharpness. As can be seen from FIG. 5, the larger the value of c'/c, the higher the value of the sharpness. Accordingly, as the value of the second adjustment gain c' increases, the more streaks and unevenness of a harmonic component can be suppressed. Also, the smaller the value of c'/c, the smaller the value of the sharpness. Accordingly, as the value of the second adjustment gain c' decreases, the more streaks and unevenness of a low frequency component may be suppressed. The printer according to the present embodiment, as described above, is capable of reducing streaks and unevenness of a predetermined frequency component by appropriately determining the ratio of the second adjustment gain c' to the first adjustment gain c.

The printer according to the present embodiment generates the second adjustment gain c' used for the control of the sharpness on the basis of the correction gain b. On the other hand, the related printer requires matrix-type data as illustrated in FIG. 11 for the control of the sharpness. Also, in order to enhance the sharpness of the printed image, the related printer needs to adjust the diffusion matrix. Further, dividing the sharpness into a plurality of stages requires the number of the diffusion matrix corresponding to the number of the stages. Unlike the related printer, the printer according to the present embodiment is capable of reducing memory usage for storing data necessary for the control of the sharpness.

It is to be appreciated that the present disclosure is not limited to the above embodiment, and various modifications and changes are possible. For example, functions and the like included in each component may be rearranged without logical inconsistency, so as to combine a plurality of constituents together or to separate them.

Figure 6:
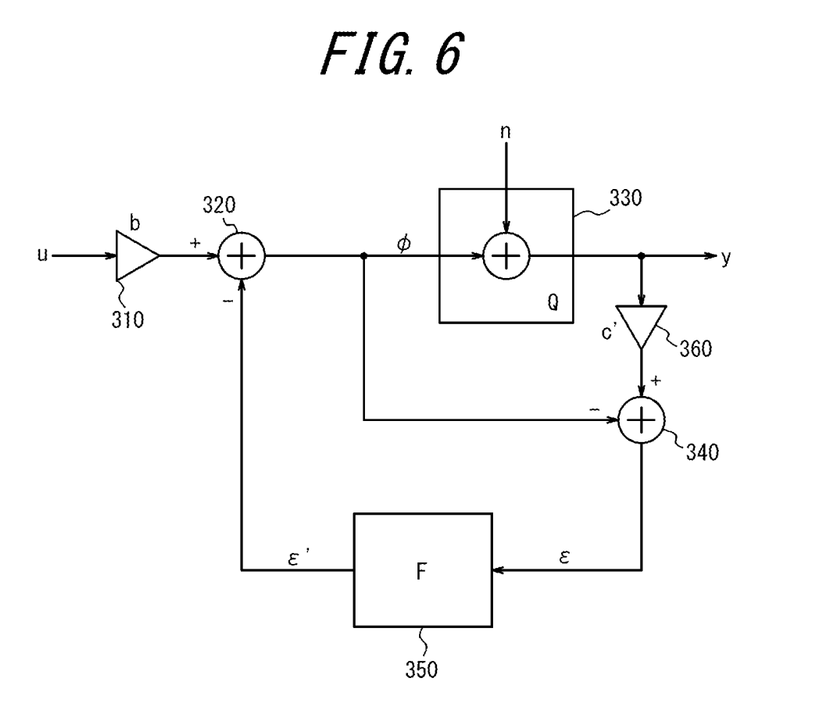
FIG. 6 is a block diagram illustrating an example of a signal processing procedure performed by a printer according to an example variation.

FIG. 6 is a block diagram illustrating an example of a signal processing procedure performed by a printer according to an example variation. The printer functions as a control apparatus for performing the processing illustrated in the block diagram of FIG. 6. The block diagram of FIG. 6 includes a first multiplier 310, a first calculator 320, a quantizer 330, a second calculator 340, a diffusion matrix 350, and a second multiplier 360. Each of the first calculator 320 and the second calculator 340 is constituted by, for example, an adder. The block diagram of FIG. 6 differs from the block diagram illustrating the example of the signal processing procedure performed by the related printer described with reference to FIG. 8, in terms of having the second multiplier 360. The functions of the first multiplier 310, the first calculator 320, the quantizer 330, the second calculator 340, and the diffusion matrix 350 are the same as those of the multiplier 510, the first calculator 520, the quantizer 530, the second calculator 540, and the diffusion matrix 550 described with reference to FIG. 8. Thus, detailed description thereof will be omitted here.

The second multiplier 360 is arranged between the quantizer 330 and the second calculator 340. A control signal $y_i$ is supplied from the quantizer 330 to the second multiplier 360. The second multiplier 360 multiplies the control signal $y_i$ output from the quantizer 330 by the adjustment gain $c'_i$. The adjustment gain $c'_i$ is, for example, the same as the second adjustment gain $c'_i$ in the above embodiment. A signal obtained by multiplication by the adjustment gain $c'_i$ in the second multiplier 360 is input to the second calculator 340. The second calculator 340 subtracts the intermediate signal y generated by the first calculator 320 from the signal input from the second multiplier 360 and thus generates an error diffusion input signal $\varepsilon_i$.

Figure 7:
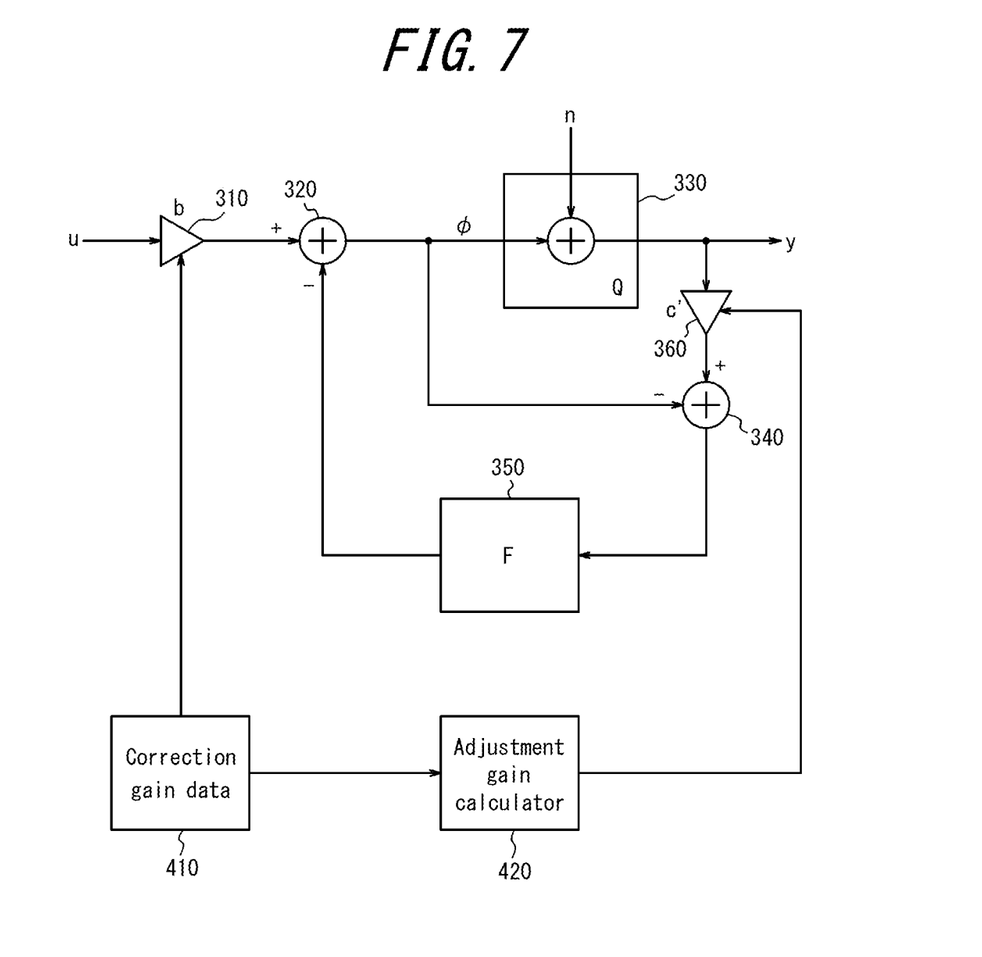
FIG. 7 is a block diagram illustrating an example of a gain input to each multiplier in the block diagram of FIG. 6.

FIG. 7 is a block diagram illustrating an example of gains (the correction gain $a_i$, and the adjustment gain $c'_i$) input to the first multiplier 310 and the second multiplier 360, respectively, in the block diagram of FIG. 6. In a manner similarly to the above embodiment, FIG. 7 illustrates an example in which the sharpness is controlled by using the correction gain $a_i$.

The correction gain data 410 is, for example, data representing the correction gain a, stored in a memory such as a semiconductor memory provided to the printer. The correction gain $a_i$, is input to the first multiplier 310 from the correction gain data 410.

The adjustment gain calculator 420 is an calculator that generates an adjustment gain $c'_i$, by performing a predetermined calculation on the correction gain $a_i$, supplied from the correction gain data 410. The adjustment gain calculator 420 may perform a predetermined output based on the correction gain $a_i$, that has been input by, for example, referring to a lookup table. The adjustment gain $c'_i$ output from the adjustment gain calculator 420 is input to the second multiplier 360.

As illustrated in FIG. 6 and FIG. 7, even when a process of multiplying the adjustment gain $c'_i$, is added to the related processing procedure, the sharpness of the image can be controlled, and streaks and unevenness at a predetermined frequency may be suppressed. In this example variation also, the adjustment gain c' is generated on the basis of the correction gain a. Thus, unlike the related printer, the memory usage for storing data necessary for the control of the sharpness may be reduced.

The invention claimed is:

1. A control apparatus for generating a control signal for controlling a printer on the basis of an input signal, the control apparatus comprising:
   a first calculator configured to generate a first calculator output signal by subtracting, from the input signal, an error diffusion output signal output from a diffusion matrix that determines a distribution of a print density error;
   a first multiplier configured to generate an intermediate signal by multiplying the first calculator output signal by a correction gain, the correction gain being used for controlling a correction amount for the print density error;
   a quantizer configured to generate the control signal by quantizing the intermediate signal;
   a second multiplier configured to multiply the control signal by an adjustment gain determined on the basis of the correction gain; and
   a second calculator configured to generate an error diffusion input signal to be input to the diffusion matrix on the basis of a signal output from the second multiplier.

2. The control apparatus according to claim 1, further comprising
   a third multiplier configured to multiply the intermediate signal by another adjustment gain different from the adjustment gain, and
   wherein the second calculator generates the error diffusion input signal by subtracting a signal output from the third multiplier from a signal output from the second multiplier.

3. A control method performed by a control apparatus for generating a control signal for controlling a printer on the basis of an input signal, the control method comprising:
   generating a first calculator output signal by subtracting, from the input signal, an error diffusion output signal output from a diffusion matrix that determines a distribution of a print density error;
   generating an intermediate signal by multiplying the first calculator output signal by a correction gain, the correction gain being used for controlling a correction amount for the print density error;
   generating the control signal by quantizing the intermediate signal;
   multiplying the control signal by an adjustment gain determined on the basis of the correction gain; and
   generating an error diffusion input signal to be input to the diffusion matrix on the basis of a signal obtained by multiplication by the adjustment gain.

4. A control apparatus for generating a control signal for controlling a printer on the basis of an input signal, the control apparatus comprising:
   a first multiplier configured to generate a first multiplier output signal by multiplying the input signal by a correction gain, the correction gain being used for controlling a correction amount for the print density error;
   a first calculator configured to generate an intermediate signal by subtracting, from the first multiplier output signal, an error diffusion output signal output from a diffusion matrix that determines a distribution of a print density error;
   a quantizer configured to generate the control signal by quantizing the intermediate signal;
   a second multiplier configured to multiply the control signal by an adjustment gain determined on the basis of the correction gain; and
   a second calculator configured to generate an error diffusion input signal to be input to the diffusion matrix on the basis of a signal output from the second multiplier.

* * * * *